United States Patent
Cai et al.

(10) Patent No.: US 10,990,123 B2
(45) Date of Patent: Apr. 27, 2021

(54) PUSH-OUT LIMITING MECHANISM AND DISPLAY SCREEN MODULE

(71) Applicant: ROE Visual Co., Ltd., Shenzhen (CN)

(72) Inventors: Danhu Cai, Shenzhen (CN); Shunwen Tian, Shenzhen (CN); Chen Lu, Shenzhen (CN); Dries Vermeulen, Shenzhen (CN)

(73) Assignee: ROE VISUAL CO., LTD., Guangdong (CN)

( * ) Notice: Subject to any disclaimer, the term of this patent is extended or adjusted under 35 U.S.C. 154(b) by 553 days.

(21) Appl. No.: 16/066,759

(22) PCT Filed: May 28, 2018

(86) PCT No.: PCT/CN2018/088674
§ 371 (c)(1),
(2) Date: Jun. 28, 2018

(87) PCT Pub. No.: WO2019/153582
PCT Pub. Date: Aug. 15, 2019

(65) Prior Publication Data
US 2020/0183446 A1 Jun. 11, 2020

(30) Foreign Application Priority Data
Feb. 6, 2018 (CN) .......................... 201810116990.3

(51) Int. Cl.
*G06F 1/16* (2006.01)
*F16M 11/04* (2006.01)

(52) U.S. Cl.
CPC ......... *G06F 1/1607* (2013.01); *F16M 11/043* (2013.01); *G06F 1/1637* (2013.01); *G06F 1/1654* (2013.01); *G06F 2200/1613* (2013.01)

(58) Field of Classification Search
CPC ............................. G06F 1/1637; G06F 1/1654
See application file for complete search history.

(56) References Cited

U.S. PATENT DOCUMENTS

| | | | | |
|---|---|---|---|---|
| 4,748,756 A | * | 6/1988 | Ross ...................... | A47G 1/0622 40/455 |
| 5,116,261 A | * | 5/1992 | Lan ........................ | E05B 53/003 292/225 |
| 5,465,514 A | * | 11/1995 | Ulysse ................... | A47G 1/101 40/783 |

(Continued)

*Primary Examiner* — Adrian S Wilson
(74) *Attorney, Agent, or Firm* — Sinorica, LLC

(57) ABSTRACT

The present invention discloses a push-out limiting mechanism and a display screen module, wherein the push-out limiting mechanism has a first mounting component which comprises a first mounting base, a plug connector arranged in the first mounting base and a first elastic member for electrically jumping the plug connector on the first mounting base; and a second mounting component which comprises a second mounting base, a plugging base arranged in the second mounting base and a second elastic member for connecting the second mounting base and the plugging base; the plug connector is vertical to a movement direction of the plugging base; and the plug connector has a first plugging part, and the plugging base has a second plugging part matched with the first plugging part. The push-out limiting mechanism has good buffering and pulling effects.

15 Claims, 4 Drawing Sheets

(56) References Cited

U.S. PATENT DOCUMENTS

| | | | |
|---|---|---|---|
| 6,209,975 B1* | 4/2001 | Lai | G06F 1/181 |
| | | | 292/81 |
| 6,234,593 B1* | 5/2001 | Chen | G06F 1/181 |
| | | | 312/223.2 |
| 6,826,863 B1* | 12/2004 | Goodfellow | G06F 1/1607 |
| | | | 248/918 |
| 6,899,407 B1* | 5/2005 | Lai | G06F 1/181 |
| | | | 312/223.2 |
| 10,713,979 B2* | 7/2020 | Cai | F16M 11/00 |
| 10,775,656 B2* | 9/2020 | Cai | G02F 1/133308 |
| 2004/0150943 A1* | 8/2004 | Rock | G06F 1/1607 |
| | | | 361/679.22 |
| 2004/0196623 A1* | 10/2004 | Erickson | G06F 1/181 |
| | | | 361/679.59 |
| 2010/0033925 A1* | 2/2010 | Zhang | H05K 5/0239 |
| | | | 361/679.58 |
| 2018/0374400 A1* | 12/2018 | Cai | G09F 9/302 |

\* cited by examiner

PUSH-OUT LIMITING MECHANISM AND DISPLAY SCREEN MODULE

TECHNICAL FIELD

The present invention relates to the field of the display screen technology, and more particularly, to a push-out limiting mechanism and a display screen module.

BACKGROUND

A display screen module generally comprises a display screen frame and a display screen body, the display screen body is detachably fixed in the display screen frame, a maintainer needs to remove the display screen body from the display screen frame along a depth direction of the display screen frame when the display screen body is disassembled, and then the display screen body can be separated from the display screen frame. Moreover, in the process that the display screen body is removed from the display screen frame, because of the inertance of the display screen body, the technique of the maintainer and other problems, the display screen body can generally move a long distance along the depth direction of the display screen frame to affect the operation of the maintainer. Moreover, since the mistaken operation of the maintainer sometimes can further damage the display screen body, the reason is that the existing display screen module is lack of a push-out limiting mechanism for buffering and pulling the display screen body.

Therefore, it is necessary to provide a push-out limiting mechanism having buffering and pulling effects, and a display screen module having the push-out limiting mechanism.

SUMMARY

The technical problem to be solved by the present invention is to provide a push-out limiting mechanism having buffering and pulling effects, and a display screen module having the push-out limiting mechanism.

In order to solve the technical problem above, the technical solution adopted in the present invention is a push-out limiting mechanism, comprising:

a first mounting component, which comprises a first mounting base, a plug connector arranged in the first mounting base and a first elastic member for electrically jumping the plug connector on the first mounting base;

a second mounting component, which comprises a second mounting base, a plugging base arranged in the second mounting base and a second elastic member for connecting the second mounting base and the plugging base;

wherein, the plug connector is vertical to a movement direction of the plugging base;

the plug connector has a first plugging part, and the plugging base has a second plugging part matched with the first plugging part; and after the plug connector is connected to the plugging base, when a distance between the first mounting component and the second mounting component becomes larger, the first plugging part pulls the second plugging part to make the plugging base protrude outside the second mounting base, and the second elastic member pulls the plugging base to make the plugging base retract.

In order to solve the technical problem above, the present invention further adopts the following technical solution: a display screen module comprises a display screen body and a display screen frame, and further comprises the push-out limiting mechanism, wherein the first mounting component is arranged in the display screen body, and the second mounting component is arranged in the display screen frame.

The present invention has the beneficial effects that: after the display screen module is arranged in the push-out limiting mechanism, when the display screen body is separated from the display screen frame, the push-out limiting mechanism can support the display screen body and limit the push-out process of the display screen body, so as to buffer and pull the display screen body, reduce the requirement on the operational proficiency of a maintainer to disassemble and assemble the display screen body, and be conductive to guaranteeing the safety of disassembling and assembling the display screen body, thus avoiding the display screen body from being broken accidently during disassembling and assembling.

Figure 1:
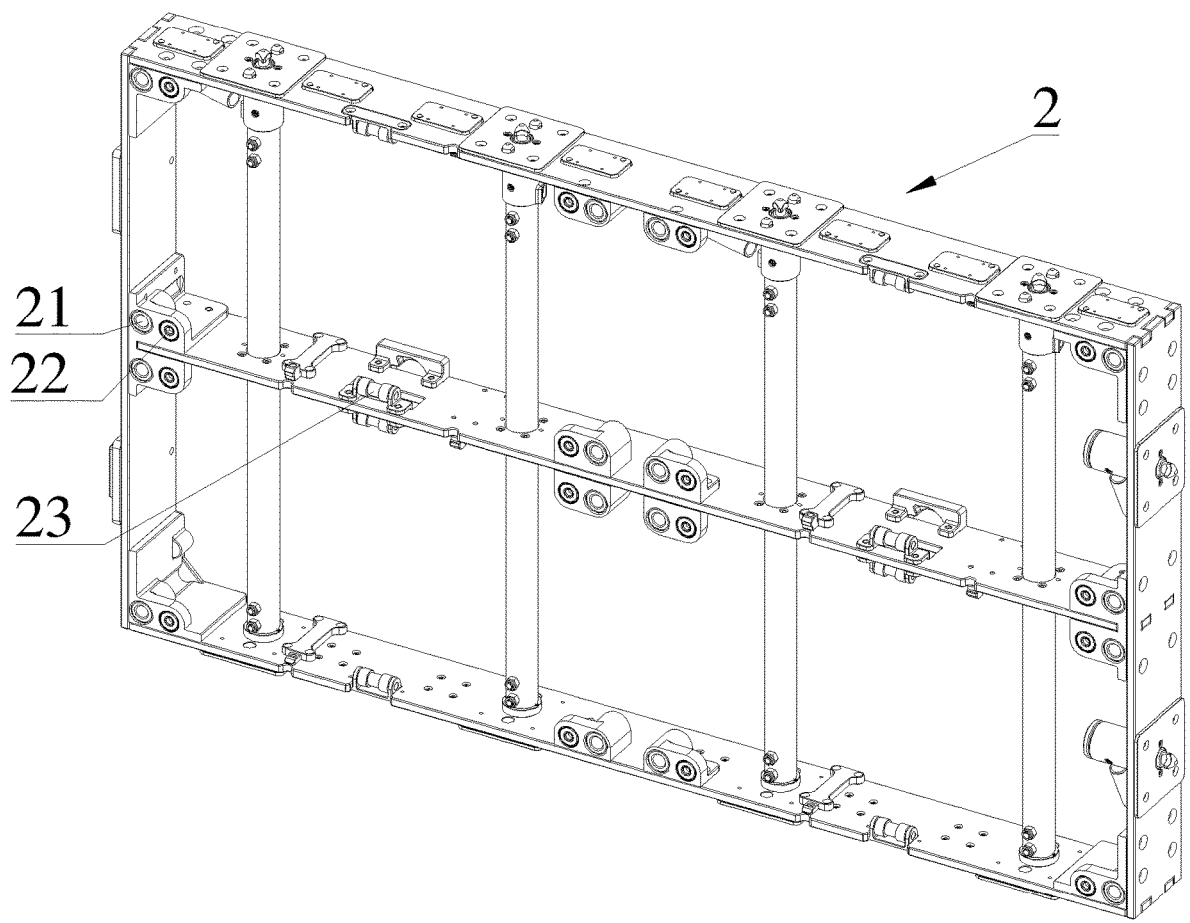
FIG. 1 is a schematic diagram illustrating a structure of a display screen frame in a display screen module of the first embodiment according to the present invention.
Figure 2:
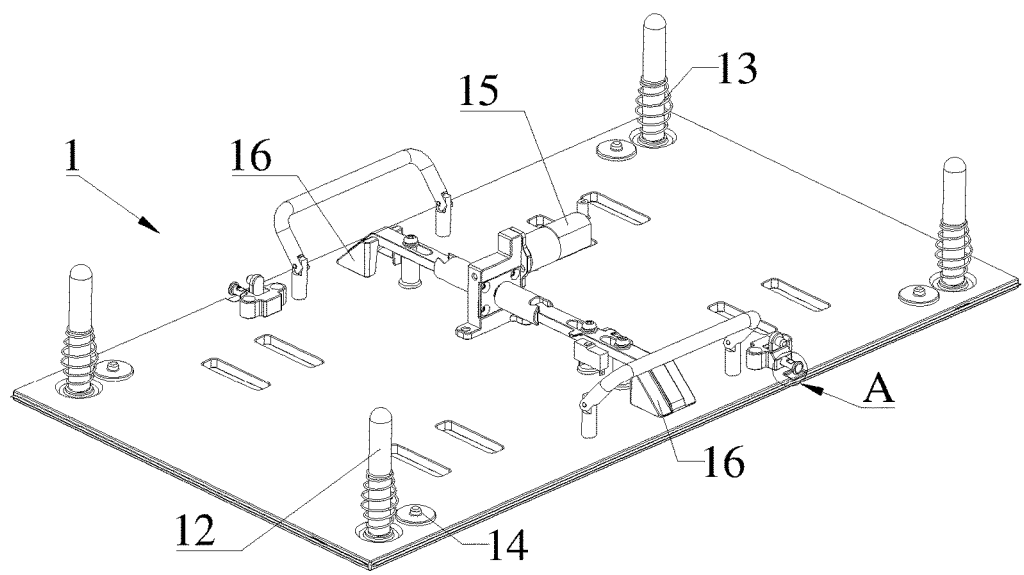
FIG. 2 is a schematic diagram illustrating a structure of a display screen body in the display screen module of the first embodiment according to the present invention.

REFERENCE NUMERALS 1 refers to display screen body; 11 refers to clearance slot; 12 refers to guidepost; 13 refers to third elastic member; 14 refers to second magnetic member; 15 refers to driving member; 16 refers to wedge block; 2 refers to display screen frame; 21 refers to guide hole; 22 refers to first magnetic member; 23 refers to roller; 3 refers to first mounting component; 31 refers to first mounting base; 311 refers to through hole; 32 refers to plug connector; 321 refers to first plugging part; 3211 refers to first inclined surface; 322 refers to mounting plate; 323 refers to lifting part; 3231 refers to disassembly slot; 33 refers to first elastic member; 4 refers to second mounting component; 41 refers to second mounting base; 42 refers to plugging base; 421 refers to second plugging part; 4211 refers to second inclined surface; 422 refers to telescopic arm; 4221 refers to limiting slot; 43 refers to second elastic member; 431 refers to clamping section; and 44 refers to limiting block.

DETAILED DESCRIPTION OF THE EMBODIMENTS

In order to describe the technical contents, the achieved objects and effects of the present invention in detail, the following description will be given with reference to the embodiments and the accompanying drawings.

Referring to FIG. 1 to FIG. 7, a push-out limiting mechanism comprises:

a first mounting component 3, which comprises a first mounting base 31, a plug connector 32 arranged in the first mounting base 31 and a first elastic member 33 for electrically jumping the plug connector 32 on the first mounting base 31;

a second mounting component 4, which comprises a second mounting base 41, a plugging base 42 arranged in the second mounting base 41 and a second elastic member 43 for connecting the second mounting base 41 and the plugging base 42;

the plug connector 32 is vertical to a movement direction of the plugging base 42;

the plug connector 32 has a first plugging part 321, and the plugging base 42 has a second plugging part 321 matched with the first plugging part 421; and after the plug connector 32 is connected to the plugging base 42, when a distance between the first mounting component 3 and the second mounting component 4 becomes larger, the first plugging part 321 pulls the second plugging part 421 to make the plugging base 42 protrude outside the second mounting base 41, and the second elastic member 43 pulls the plugging base 42 to make the plugging base 42 retract.

The structural principle of the present invention is simply described as follows: the second elastic member 43 has elastic deformation when the first mounting component 3 displaces along the movement direction of the plugging base 42, so as to make the second mounting component 4 buffer and pull an object for fixing the first mounting component 3; and the first elastic member 33 can make the first plugging part 321 of the plug connector 32 be steadily connected to the second plugging part 421 of the plugging base 42.

It can be known from the description above, the beneficial effect of the present invention lies in that: when the first and the second mounting components are separated, the second mounting component can support the first mounting component and limit the process of the first mounting component, so as to buffer and pull the first mounting component.

Further, the first mounting component 3 is provided with a lifting part 323, the lifting part 323 is located outside the first mounting base 31, one end of the lifting part is connected to the plug connector 32 through the first mounting base 31, one end of the plug connector 32 is connected to one end of the first elastic member 33, and the first elastic member 33 is located in the first mounting base 31. In this way, the plug connector 32 can be pulled to move while the lifting part 323 is pulled, and when the lifting part 323 is loosened, through the elasticity of the first elastic member 33, the plug connector 32 is pulled back to original position by the first elastic member 33, so as to realize the effect of automatic reset.

Further, the plug connector 32 comprises a mounting plate 322 and a lifting part 323 connected to the mounting plate 322, and the first plugging part 321 is arranged in the mounting plate 322; the first mounting base 31 has a through hole 311 arranged along a movement direction of the plugging base 42 and a penetrable hole arranged along a movement direction of the plug connector 32, one end of the penetrable hole is communicated with the through hole 311, a portion of the lifting part 323 is located in the penetrable hole and is slidably arranged along an axial direction of the penetrable hole, the first elastic member 33 is located in the through hole 311, one end of the first elastic member 33 is connected to the mounting plate 322, and the other end of the first elastic member 33 is connected to the first mounting base 31.

It can be known from the description above that, a user can connect or separate the first and the second plugging parts through the lifting part, and the operation is simple and convenient; and a portion of the lifting part can rotationally arranged in the penetrable hole, which is conductive to increasing the stability of the structure of the first mounting component.

Further, the second mounting base 41 is a housing, the housing has a chute arranged along the movement direction of the plugging base 42, and a portion of the plugging base 42 and the second elastic member 43 are respectively located in the chute.

It can be known from the description above that, the chute can limit the plugging base, thus avoiding unsmooth displacement of the first mounting component caused by accident deviation when the plugging base is operated.

Further, the plugging base 42 comprises a telescopic arm 422, a portion of the telescopic arm 422 is located in the chute, and the second plugging part 421 is arranged at one end of the telescopic arm 422 far from the second elastic member 43; and the telescopic arm 422 has a limiting slot 4221 arranged along the movement direction of the plugging base 42, and the housing has a limiting block matched with the limiting slot 4221, or;

the housing has a limiting slot 4221 arranged along the movement direction of the plugging base 42, and the telescopic arm 422 has a limiting block matched with the limiting slot 4221.

It can be known from the description above that, the limiting slot and the limiting block can further increase the stability of the structure of the second mounting component, which is conductive to making the telescopic arm slide more smoothly.

The second elastic member is a spring, a housing and the plugging base are respectively provided with a clamping notch, two ends of the second elastic member are respectively clamped in the clamping notches of the housing and the plugging base, so that the housing is connected to the plugging base by the second elastic member. The second elastic member has the effect of pulling the housing and the plugging base, after the plugging base is pulled to slide in the housing, the elasticity of the second elastic member will prevent the plugging base from being pulled to a long distance, which plays a role of limiting, and after the plugging base is loosened, the elasticity of the second elastic member will pull back the plugging base to make the plugging base get back to the original position, thus realizing the effect of automatic reset.

Further, the second elastic member 43 is a spring, two ends of the spring are respectively provided with a clamping section 431, an outer diameter of the clamping section 431 is smaller than an outer diameter of a middle portion of the spring and is also smaller than outer diameters of two end parts of the spring, a housing and the plugging base 42 are respectively provided with a clamping notch matched with the clamping section 431, one clamping section 431 of the second elastic member 43 is clamped in the clamping notch of the housing, and the other clamping section 431 of the second elastic member 43 is clamped in the clamping notch of the plugging base 42.

It can be known from the description above that, a connecting structure between the second elastic member, and the housing and the plugging base is simple and stable, and the maintainer can maintain the second mounting component more conveniently.

Further, the plugging base 42 is provided with a first inclined surface 3211 facilitating the insertion of the first plugging part 321 into the second plugging part 421.

It can be known from the description above that, the first inclined surface on the plugging base can make the maintainer connect the first and the second mounting components more conveniently and efficiently.

The first inclined surface inclines outwardly, and is located at the same side as a plugging surface of the second plugging part. In this way, the first inclined surface is directly and quickly contacted with the first plugging part 321, so that the first plugging part 321 is accurately and quickly inserted in the second plugging part 421, which also plays a role of guiding.

A display screen module comprises a display screen body 1 and a display screen frame 2, and further comprises the push-out limiting mechanism, wherein the first mounting component 3 is arranged in the display screen body 1, and the second mounting component 4 is arranged in the display screen frame 2.

It can be known from the description above that, the present invention has the beneficial effect that: after the display screen module is arranged in the push-out limiting mechanism, when the display screen body is separated from the display screen frame, the push-out limiting mechanism can support the display screen body and limit a push-out process of the display screen body, so as to buffer and pull the display screen body, reduce the requirement on the operational proficiency of a maintainer to disassemble and assemble the display screen body, and be conductive to guaranteeing the safety of disassembling and assembling the display screen body, thus avoiding the display screen body from being broken accidently during disassembling and assembling.

Further, the display screen body 1 is provided with at least two first mounting components 3, and two opposite sides of the display screen body 1 are respectively provided with one first mounting component 3.

It can be known from the description above that, no matter whether the display screen body is manually removed or the display screen body is automatically ejected, the push-out limit mechanism can have very good buffering and pulling effects on the display screen body.

Further, the display screen frame 2 is provided with a guide base, the guide base is provided with a guide hole 21, the display screen body 1 is provided with a guidepost 12 matched with the guide hole 21, a third elastic member 13 is sleeved on the guidepost 12, one end of the third elastic member 13 is connected to the display screen body 1, and the other end of the third elastic member 13 abuts with the guide base; and when the display screen body 1 is separated from the display screen frame 2, the third elastic member 13 resumes elastic deformation, so that the display screen body 1 drives the first mounting component 3 to displace along the a movement direction of the plugging base 42.

It can be known from the description above that, once the maintainer breaks the connection between the display screen body and the display screen frame, the third elastic member will quickly pop up the display screen body, and at the moment, the buffering and pulling effects of the push-up limiting mechanism can be completely shown, so as to fully guarantee that the display screen body cannot be damaged.

Further, the display screen frame 2 is provided with a first magnetic member 22, and the display screen body 1 is provided with a second magnetic member 14 matched with the first magnetic member 22; the display screen body 1 is further provided with an ejecting mechanism, the ejecting mechanism comprises a driving member 15 and a wedge block 16, and the driving member 15 is connected to the wedge block 16 and drives the wedge block 16 along the movement direction of the plug connector 32. The display screen frame 2 is provided with a roller 23 matched with the wedge block 16, an axial direction of the roller 23 is vertical to the movement direction of the plug connector 32, the wedge block 16 is located between the display screen body 1 and the roller 23, and an inclined surface of the wedge block 16 is close to the roller 23.

The working principle of the present invention is simple described as follows: when the driving member 15 drives the wedge block 16, the inclined surface of the wedge block 16 abuts with the roller 23, when the driving member 15 continuously drives the wedge block 16, the wedge block 16 can make the distance between the display screen body 1 and the display screen frame 2 become larger, so that a magnetic attraction force between the first and the second magnetic members is smaller than the elasticity of the third elastic member 13; and then the third elastic member 13 resumes the deformation to make the display screen body 1 pop up, and then the push-up limiting mechanism can buffer and pull the display screen body 1.

It can be known from the description above that, the connecting structure of the display screen body and the display screen frame is simple and artful.

First Embodiment

Referring to FIG. 1 to FIG. 7, the first embodiment of the present invention is that: a display screen module comprises a display screen body 1 and a display screen frame 2, and further comprises a push-out limiting mechanism, and the push-out limiting mechanism comprises:

a first mounting component 3, which comprises a first mounting base 31, a plug connector 32 arranged in the first mounting base 31 and a first elastic member 33 for electrically jumping the plug connector 32 on the first mounting base 31;

a second mounting component 4, which comprises a second mounting base 41, a plugging base 42 arranged in the second mounting base 41 and a second elastic member 43 for connecting the second mounting base 41 and the plugging base 42;

the plug connector 32 is vertical to a movement direction of the plugging base 42;

the plug connector 32 has a first plugging part 321, and the plugging base 42 has a second plugging part 321 matched with the first plugging part 421; and after the plug connector 32 is connected to the plugging base 42, when a distance between the first mounting component 3 and the second mounting component 4 becomes larger, the first plugging part 321 pulls the second plugging part 421 to make the plugging base 42 protrude outside the second mounting base 41, and the second elastic member 43 pulls the plugging base 42 to make the plugging base 42 retract.

The first mounting component 3 is arranged in the display screen body 1, and the second mounting component 4 is arranged in the display screen frame 2.

Preferably, the plug connector 32 comprises a mounting plate 322 and a lifting part 323 connected to the mounting plate 322, and the first plugging part 321 is arranged in the mounting plate 322; the first mounting base 31 has a through hole 311 arranged along a movement direction of the plugging base 42 and a penetrable hole (not shown in drawings) arranged along a movement direction of the plug connector 32, one end of the penetrable hole is communicated with the through hole 311, a portion of the lifting part 323 is located in the penetrable hole and is slidably arranged along an axial direction of the penetrable hole, a portion of the mounting plate 322 and the first elastic member 33 are respectively located in the through hole 311, one end of the first elastic member 33 is connected to the mounting plate 322, and the other end of the first elastic member 33 is connected to the first mounting base 31.

Figure 3:
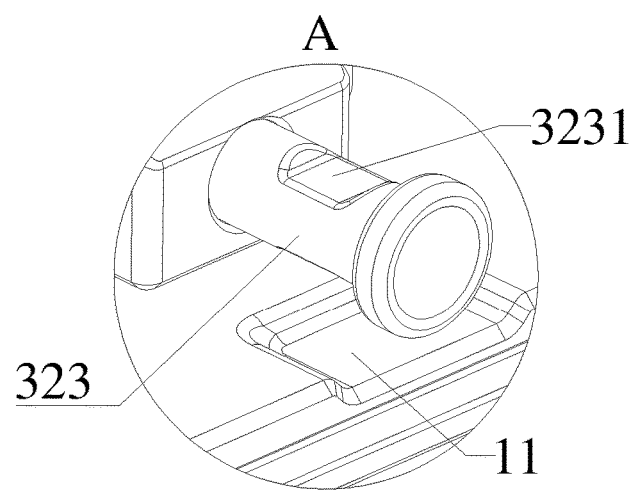
FIG. 3 is an enlarged diagram of detail A in FIG. 2.
Figure 4:
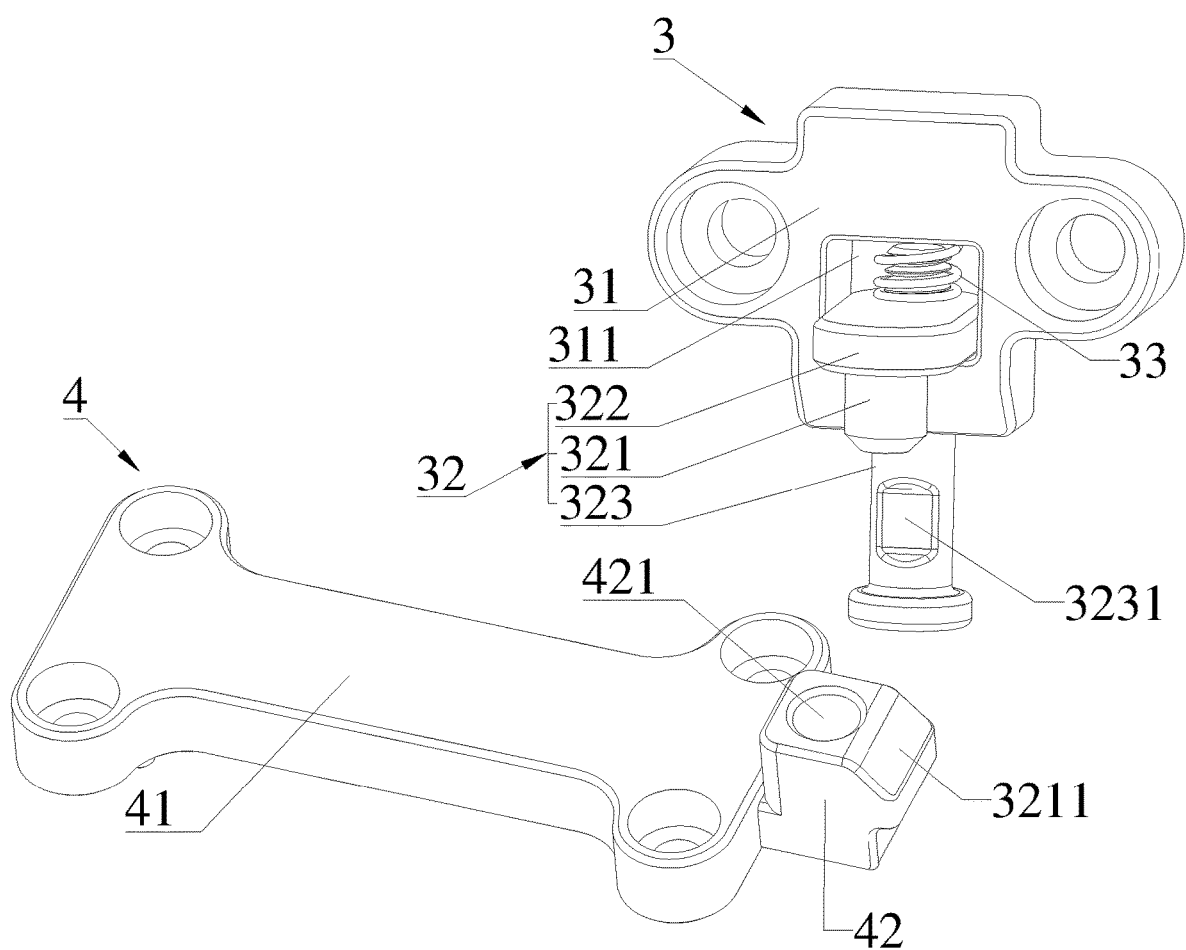
FIG. 4 is a schematic diagram illustrating an overall structure of a push-out limiting mechanism of the first embodiment according to the present invention.
Figure 5:
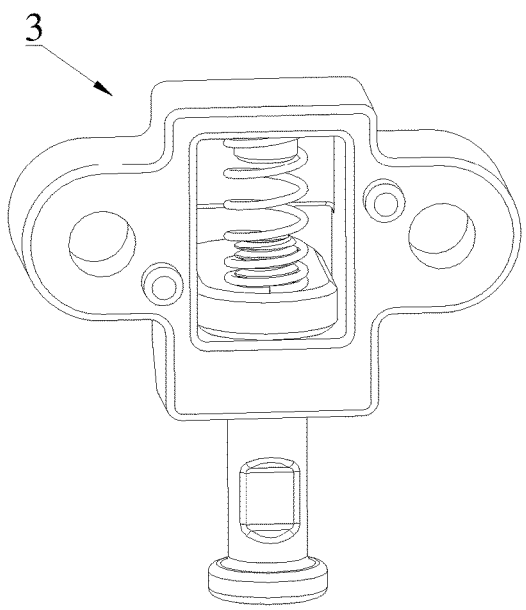
FIG. 5 is a schematic diagram illustrating a structure of a first mounting component in the push-out limiting mechanism of the first embodiment according to the present invention.
Figure 6:
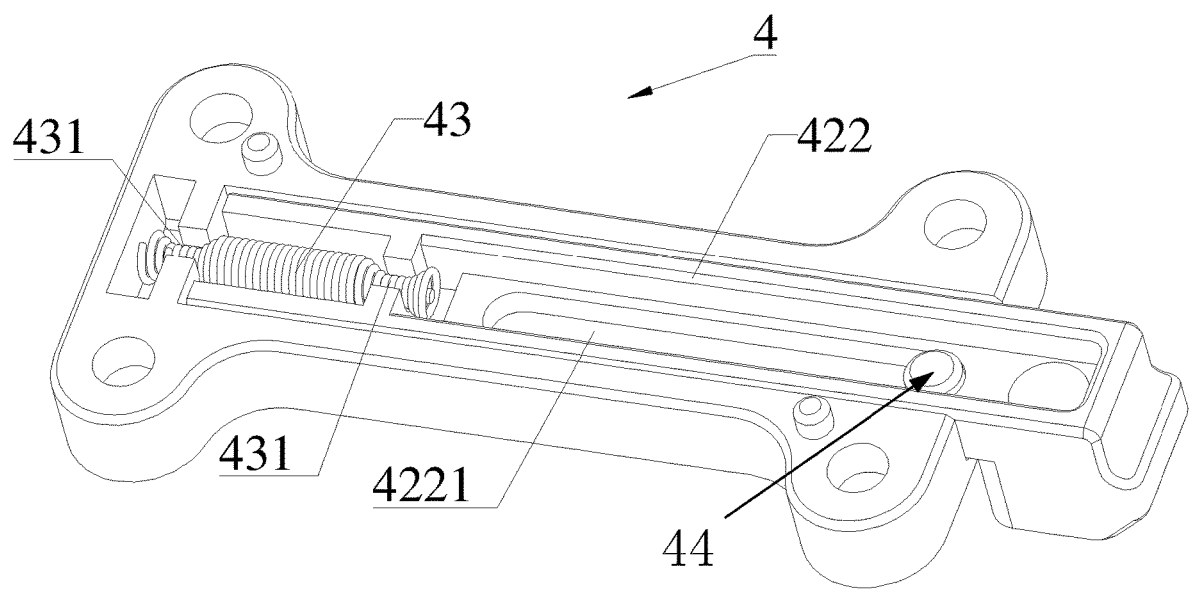
FIG. 6 is a schematic diagram illustrating a structure of a second mounting component in the push-out limiting mechanism of the first embodiment according to the present invention.
Figure 7:
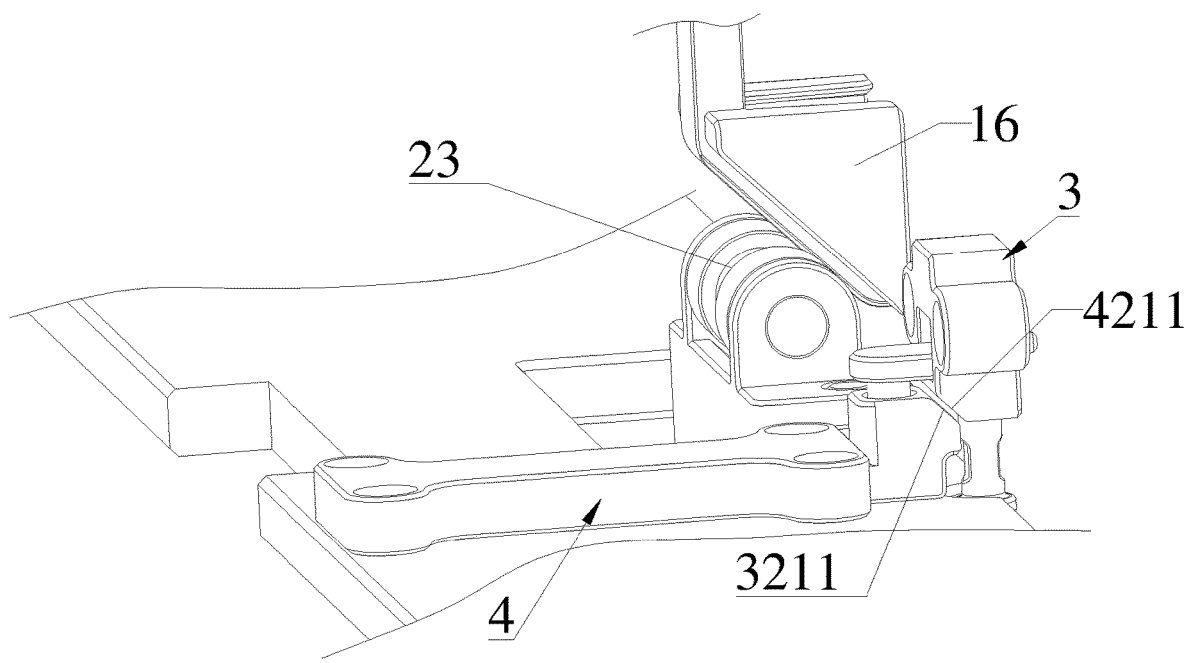
FIG. 7 is a partial schematic diagram of a setting area of the push-out limiting mechanism in the display screen module of first embodiment according to the present invention.

In the embodiment, the first plugging part 321 is a bolt, the second plugging part 421 is jack arranged along a axial direction of the bolt, and the lifting part 323 and the first plugging part 321 are located at the same side of the mounting plate 322. Preferably, the lifting part 323 is a column, a periphery wall of the columnar lifting part 323 is provided with a disassembly slot, and as shown in FIG. 3, the area of the display screen body 1 corresponding to the lifting part 323 is provided with a clearance slot.

Further, the second mounting base 41 is a housing, the housing has a chute arranged along the movement direction of the plugging base 42, and a portion of the plugging base 42 and the second elastic member 43 are respectively located in the chute.

Specifically, the plugging base 42 comprises a telescopic arm 422, a portion of the telescopic arm 422 is located in the chute, and the second plugging part 421 is arranged at one end of the telescopic arm 422 far from the second elastic member 43; the telescopic arm 422 has a limiting slot 4221 arranged along the movement direction of the plugging base 42, the housing has a limiting block 44 matched with the limiting slot 4221, and the limiting block is located in the limiting slot 4221; and certainly, the limiting slot 4221 is arranged in the housing along the movement direction of the plugging base 42, and the limiting block matched with the limiting slot 4221 can also be arranged on the telescopic arm 422. The limiting block is used to make the telescopic arm 422 have a guiding effect on sliding in the housing, and the swinging of the telescopic arm 422 in the housing during sliding can be reduced.

In the embodiment, the second elastic member 43 is a spring, two ends of the spring are respectively provided with a clamping section 431, an outer diameter of the clamping section 431 is smaller than an outer diameter of a middle portion of the spring and is also smaller than outer diameters of two end parts of the spring, a housing and the plugging base 42 are respectively provided with a clamping notch matched with the clamping section 431, one clamping section 431 of the second elastic member 43 is clamped in the clamping notch of the housing, and the other clamping section 431 of the second elastic member 43 is clamped in the clamping notch of the plugging base 42.

In order to facilitate the connection of the first and the second plugging parts, the plugging base 42 is provided with a first inclined surface 3211 facilitating the insertion of the first plugging part 321 into the second plugging part 421. Preferably, the first mounting base 31 is provided with a second inclined surface 4211 for clearance to the first inclined surface 3211.

Preferably, the display screen body 1 is provided with at least two first mounting components 3, and two opposite sides of the display screen body 1 are respectively provided with at least one first mounting component 3.

Preferably, the display screen frame 2 is provided with a guide base, the guide base is provided with a guide hole 21, the display screen body 1 is provided with a guidepost 12 matched with the guide hole 21, a third elastic member 13 is sleeved on the guidepost 12, one end of the third elastic member 13 is connected to the display screen body 1, and the other end of the third elastic member 13 abuts with the guide base; and when the display screen body 1 is separated from the display screen frame 2, the third elastic member 13 resumes elastic deformation, so that the display screen body 1 drives the first mounting component 3 to displace along the a movement direction of the plugging base 42.

In the embodiment, the display screen frame 2 is provided with a first magnetic member 22, and the display screen body 1 is provided with a second magnetic member 14 matched with the first magnetic member 22; the display screen body 1 is further provided with an ejecting mechanism, the ejecting mechanism comprises a driving member 15 and a wedge block 16, and the driving member 15 is connected to the wedge block 16 and drives the wedge block 16 along the movement direction of the plug connector 32. The display screen frame 2 is provided with a roller 23 matched with the wedge block 16, an axial direction of the roller 23 is vertical to the movement direction of the plug connector 32, the wedge block 16 is located between the display screen body 1 and the roller 23, and an inclined surface of the wedge block 16 is close to the roller 23.

In the combination of FIG. 1, FIG. 2, FIG. 4 and FIG. 7, the mounting process of the display screen body 1 and the display screen frame 2 in the display screen module is simply described as follows: after a portion of the guidepost 12 on the display screen body 1 enters the guide hole 21 in the display screen frame 2, the display screen body 1 is continuously pressed, the cooperative effect of the first inclined surface 3211 on the plugging base 42 and the first elastic member 33 makes the first plugging part 321 be inserted into the second plugging port 421, the first and the second magnetic members are connected in a magnetic way, a magnetic attraction force between the first and the second magnetic members is larger than the elasticity of the third elastic member 13, and the display screen body 1 is installed with the display screen frame 2.

The disassembly process of the display screen body 1 and the display screen frame 2 in the display screen module of the present invention is simply described as follows: firstly, the driving member 15 drives the wedge block 16 to make the distance between the display screen body 1 and the display screen frame 2 become larger gradually, and the magnetic attraction force between the first and the second magnetic members is smaller than the elasticity of the third elastic member 13, the third elastic member 13 pops up the display screen body 1, the plug connector 32 in the first mounting component 3 on the display screen body 1 pulls the plugging base 42 to displace, and the second elastic member 43 deforms, so that the display screen body 1 is pulled back, and when a pulling force of the second elastic member 43 is equal to the elasticity of the third elastic member 13, the display screen body 1 is static; and then the maintainer pulls the lifting part 323 to unlock the first and the second plugging parts, and the display screen body 1 is disassembled from the display screen frame 2.

In conclusion, the push-out limiting mechanism provided by the present invention has good buffering and pulling effects; after the display screen module is arranged in the push-out limiting mechanism, when the display screen body is separated from the display screen frame, the push-out limiting mechanism can support the display screen body and limit a push-out process of the display screen body, so as to reduce the requirement on the operational proficiency of a maintainer to disassemble and assemble the display screen body, and be conductive to guaranteeing the safety of disassembling and assembling the display screen body, thus avoiding the display screen body from being broken accidently during disassembling and assembling.

The foregoing descriptions are merely the embodiments of the present invention instead of limiting the patent scope of the present invention, all equal transformations made by the contents of the description and the drawings of the present invention, or directly or indirectly applied in related technical field, shall be included in the protection scope of the patent of the present invention.

The invention claimed is:

1. A push-out limiting mechanism, comprising:
a first mounting component, which comprises a first mounting base, a plug connector arranged in the first mounting base and a first elastic member for electrically jumping the plug connector on the first mounting base;
a second mounting component, which comprises a second mounting base, a plugging base arranged in the second mounting base and a second elastic member for connecting the second mounting base and the plugging base;
wherein, the plug connector is vertical to a movement direction of the plugging base;
the plug connector has a first plugging part, and the plugging base has a second plugging part matched with the first plugging part; and
after the plug connector is connected to the plugging base, when a distance between the first mounting component and the second mounting component becomes larger, the first plugging part pulls the second plugging part to make the plugging base protrude outside the second mounting base, and the second elastic member pulls the plugging base to make the plugging base retract.

2. The push-out limiting mechanism according to claim 1, wherein the first mounting component is provided with a lifting part, the lifting part is located outside the first mounting base, one end of the lifting part is connected to the plug connector through the first mounting base, one end of the plug connector is connected to one end of the first elastic member, and the first elastic member is located in the first mounting base.

3. The push-out limiting mechanism according to claim 1, wherein the plug connector comprises a mounting plate and a lifting part connected to the mounting plate, and the first plugging part is arranged in the mounting plate; the first mounting base has a through hole arranged along a movement direction of the plugging base and a penetrable hole arranged along a movement direction of the plug connector, one end of the penetrable hole is communicated with the through hole, a portion of the lifting part is located in the penetrable hole and is slidably arranged along an axial direction of the penetrable hole, the first elastic member is located in the through hole, one end of the first elastic member is connected to the mounting plate, and the other end of the first elastic member is connected to the first mounting base.

4. The push-out limiting mechanism according to claim 1, wherein the second mounting base is a housing, the housing has a chute arranged along the movement direction of the plugging base, and a portion of the plugging base and the second elastic member are respectively located in the chute.

5. The push-out limiting mechanism according to claim 3, wherein the plugging base comprises a telescopic arm, a portion of the telescopic arm is located in the chute, and the second plugging part is arranged at one end of the telescopic arm far from the second elastic member; and the telescopic arm has a limiting slot arranged along the movement direction of the plugging base, and the housing has a limiting block matched with the limiting slot.

6. The push-out limiting mechanism according to claim 3, wherein the housing has a limiting slot arranged along the movement direction of the plugging base, and the telescopic arm has a limiting block matched with the limiting slot.

7. The push-out limiting mechanism according to claim 3, wherein the second elastic member is a spring, a housing and the plugging base are respectively provided with a clamping notch, two ends of the second elastic member are respectively clamped in the clamping notches of the housing and the plugging base, so that the housing is connected to the plugging base by the second elastic member.

8. The push-out limiting mechanism according to claim 3, wherein the second elastic member is a spring, two ends of the spring are respectively provided with a clamping section, an outer diameter of the clamping section is smaller than an outer diameter of a middle portion of the spring and is also smaller than outer diameters of two end parts of the spring, a housing and the plugging base are respectively provided with a clamping notch matched with the clamping section, one clamping section of the second elastic member is clamped in the clamping notch of the housing, and the other clamping section of the second elastic member is clamped in the clamping notch of the plugging base.

9. The push-out limiting mechanism according to claim 1, wherein the plugging base is provided with a first inclined surface facilitating the insertion of the first plugging part into the second plugging part.

10. The push-out limiting mechanism according to claim 9, wherein the first inclined surface inclines outwardly, and is located at the same side as a plugging surface of the second plugging part.

11. A display screen module, comprising a display screen body and a display screen frame, and further comprising the push-out limiting mechanism according to claim 1, wherein the first mounting component is arranged in the display screen body, and the second mounting component is arranged in the display screen frame.

12. The display screen module according to claim 11, wherein the display screen body is provided with at least two first mounting components, and two opposite sides of the display screen body are respectively provided with one first mounting component.

13. The display screen module according to claim 11, wherein the display screen frame is provided with a guide base, the guide base is provided with a guide hole, the display screen body is provided with a guidepost matched with the guide hole, a third elastic member is sleeved on the guidepost, one end of the third elastic member is connected to the display screen body, and the other end of the third elastic member abuts with the guide base; and
when the display screen body is separated from the display screen frame, the third elastic member resumes elastic deformation, so that the display screen body drives the first mounting component to displace along the a movement direction of the plugging base.

14. The display screen module according to claim 13, wherein the display screen frame is provided with a first magnetic member, and the display screen body is provided with a second magnetic member matched with the first magnetic member; the display screen body is further provided with an ejecting mechanism, the ejecting mechanism comprises a driving member and a wedge block, and the driving member is connected to the wedge block and drives the wedge block along the movement direction of the plug connector.

15. The display screen module according to claim 14, wherein the display screen frame is provided with a roller matched with the wedge block, an axial direction of the roller is vertical to the movement direction of the plug connector, the wedge block is located between the display screen body and the roller, and an inclined surface of the wedge block is close to the roller.

* * * * *